June 13, 1967 G. R. BRAME 3,324,984
CENTRIFUGALLY RELEASED CLUTCH WITH TRIGGER
RELEASED AUXILIARY WEIGHTS
Filed Sept. 13, 1965 2 Sheets-Sheet 1
FIG. 2
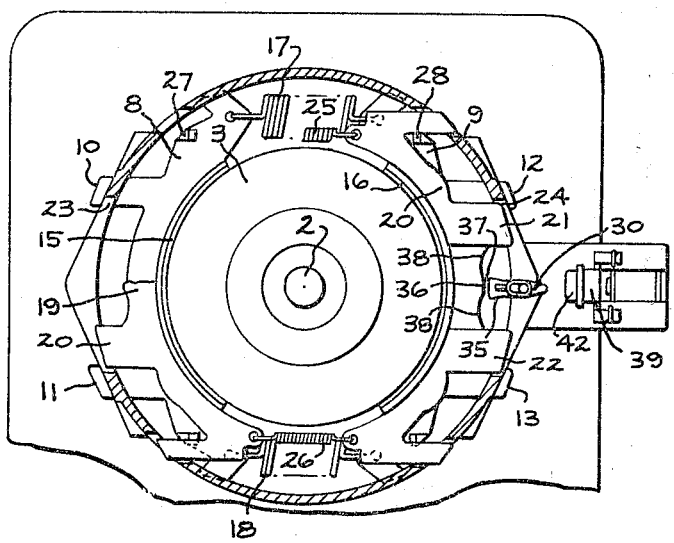
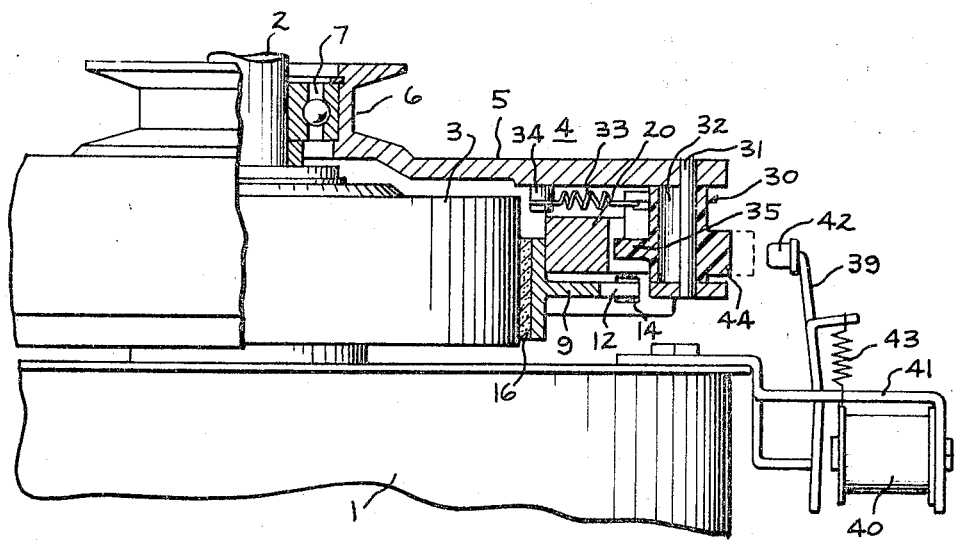
FIG. 1
INVENTOR.
GORDON R. BRAME
BY Radford M. Reams
HIS ATTORNEY

United States Patent Office 3,324,984
Patented June 13, 1967

3,324,984
CENTRIFUGALLY RELEASED CLUTCH WITH
TRIGGER RELEASED AUXILIARY WEIGHTS
Gordon R. Brame, Louisville, Ky., assignor to General
Electric Company, a corporation of New York
Filed Sept. 13, 1965, Ser. No. 486,790
3 Claims. (Cl. 192—104)

This invention relates to clutches, and more particularly to multi-speed clutches of the type which are centrifugally controlled.

It is an object of my invention to provide a new and improved multi-speed clutch wherein use is made of centrifugal force in order to obtain different speeds.

A further, more specific, object of my invention is to provide an improved clutch of the type wherein the centrifugally responsive members are mounted on the driven member of the clutch.

Yet a further specific object of my invention is the provision of an improved actuating system for such a clutch, which prevents excessive noise as the clutch accelerates to operational speed.

Centrifugally controlled multi-speed clutches of the type disclosed in Patent 3,159,257, issued on Dec. 1, 1964, to John Bochan and assigned to the General Electric Company, assignee of the present invention, very effectively provide multi-speed clutching operations. Such clutches have, coaxially mounted, an input member or drum and a driven output member. On the output member, clutching means are movably mounted so as to have a clutching surface engageable with the drum. When the clutching surface engages the drum it effects a driving connection from the drum to the driven member through the clutching means.

The clutching means is normally biased into engagement with the input member by a spring so that at least a part of its mass is acted on by centrifugal force in opposition to the spring. As a result, the force of the spring is overcome at a predetermined speed, and the clutch will not accelerate any further. An auxiliary mass is also mounted on the driven member and is spring biased out of engagement with the clutching means. The auxiliary mass is acted on by centrifugal force at a speed lower than the normal operational speed of the clutching means to overcome its biasing spring and move into engagement with the clutching means. Therefore, the effective mass of the clutching means is increased and the clutching means will overcome its biasing spring at a lower speed.

A trigger is mounted on the driven member and normally holds the auxiliary mass out of contact with the clutching means. A selection means is included for selectively activating the trigger to allow the auxiliary mass to move into contact with the clutching means. The selection means is normally set prior to an operation and, in prior art clutches, this pre-operational selection caused the clutch to be excessively noisy. This resulted from the fact that the trigger and selection means were repeatedly brought into engagement as the clutch rotated, until an output speed was reached at which the auxiliary mass was moved by centrifugal force. Such a noise in operation may be very distracting and, where such a clutch is utilized in a machine such as an automatic clothes washer, it may in fact cause the operator to believe the machine to be broken when, in fact, there is nothing wrong.

As an important aspect of my invention I mount the trigger on the driven member and bias it inwardly so that it too moves outwardly in response to rotation of the driven member. Thus the path of the trigger and the position of the selection means do not intersect until just before the the driven member has reached the desired operational speed. One very advantageous arrangement for accomplishing this is to mount the trigger so that it is moved outwardly by the auxiliary mass as the auxiliary mass moves in response to centrifugal force due to the driven member rotation.

The subject matter which I regard as my invention is particularly pointed out and distinctly claimed in the concluding portion of the specification. My invention, however, both as to organization and method of operation, together with further objects and advantages thereof, may best be understood by reference to the following description taken in conjunction with the accompanying drawings.

In the drawings,

FIGURE 1 is a fragmentary side elevational view of one embodiment of my improved clutch, the mechanism being partly broken away and partly in section to illustrate details;

FIGURE 2 is a plan view of the mechanism of FIGURE 1 showing the auxiliary mass and trigger in first position, the view being partly broken away and partly in section for purposes of illustration;

Figure 3:
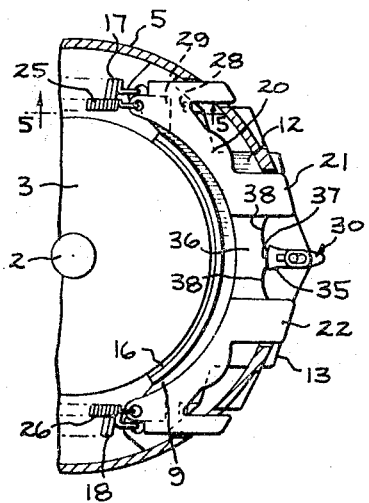
FIGURE 3 is a fragmentary plan view similar to FIGURE 2 illustrating a second position of the auxiliary mass and trigger.

Referring now particularly to FIGURES 1 and 2, there is shown part of a suitable drive source, such as a motor 1, which has an output shaft 2 to which is secured the input member or drum 3 of a clutch genereally indicated at 4. Positioned around drum 3 is an output member or second drum 5. Output drum 5 may conventionally include an output pulley 6 as an integral part thereof and is coaxially mounted with driving drum 3 through a ball bearing mount 7 by means of which the drum 4 is rotatably secured on shaft 2 so it can rotate relative to the shaft.

Output drum 5 carries clutching means in the form of ap air of speed responsive or centrifugally operated clutch shoes 8 and 9. Shoes 8 and 9 comprise curved members which are positioned between the drums 3 and 5 and include outwardly extending tabs such as 10 and 11 on shoe 8 and tabs 12 and 13 on shoe 9. These tabs fit into slots in the outer wall of drum 5, such as that shown at 14. This interfitting relationship between the tabs and slots serves to mount the shoes 8 and 9 on the driven member 5 and also to provide a positive driving connection so that the shoes may drive the drum 5. The fit between the tabs and the mounting slots is sufficiently loose that the shoes may slide radially inwardly and outwardly with respect to the outer drum. Shoes 8 and 9 are provided respectively with inner friction surfaces or members 15 and 16, and are normally biased toward each other by means of tension springs 17 and 18 connected between them so that the friction surfaces are provided with a driven engagement with input drum 3. In other words, when the input drum is at rest, it is contacted by shoes 8 and 9 under the biasing force of springs 17 and 18. As a result, when the input member drum 3 is driven it will drive the output drum 5 through the shoes 8 and 9.

As the output drum 5 accelerates, the centrifugal force created by its rotation begins to reduce the pressure with which the clutch shoes 8 and 9 engage the inner drum 3. In other words, the mass of the shoes responds to the centrifugal force to act against springs 16 and 17, and this opposition to the biasing force of the spring causes the pressure with which the shoes 8 and 9 engage drum 3 to lessen. Thus, the higher the speed of driven member 5, the smaller the pressure between the clutch shoes and the input drum 3, and the smaller is the torque which can be transmitted to the driven member 5. The shoes in fact, begin to slip with respect to the inner drum if the speed is increased beyond a certain point, i.e., the shoes are ineffective to increase the speed of the output drum 5 and the load to which it is connected (not shown) any further. Thus, the structure provides the torque necessary to keep output member 5 rotating at a constant speed regardless of the input speed, provided the input speed is sufficiently high to cause this effect to take place, below the driving speed of motor 1. It will be seen that this constant output speed for any given load attached to driven member 5 is dependent upon the mass of shoes 8 and 9 which oppose the biasing force of springs 17 and 18.

In order to vary this output speed, I provide a pair of auxiliary weights 19 and 20 which are secured on driven member 5 in the manner similar to shoes 8 and 9. In other words, the weights are respectively provided with tabs such as those shown at 20, 21 and 22, which extend through slots 23 and 24 in output member 5 so as to permit the weights to be radially movable. The weights are biased toward each other by a pair of springs 25 and 26 which preferably are very weak so that they exert just enough force to bias the weights toward each other to the position shown in FIGURES 1 and 2, but are overcome by centrifugal force at relatively low speed.

Figure 5:
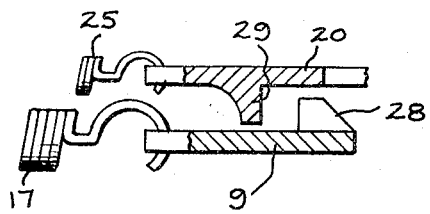
FIGURE 5 is an enlarged fragmentary elevational view showing the arrangement of parts whereby the auxiliary mass engage the clutch means.

Weights 19 and 20 are aligned with shoes 8 and 9 and, in the embodiment shown in the drawings are positioned directly above them. In order to permit connection of the weights 19 and 20 to shoes 8 and 9, the shoes are provided with upwardly extending tabs such as those indicated at 27 and 28 and the weights are provided with corresponding downwardly extending tabs such as that shown at 29 in FIGURE 5. Thus, as the auxiliary weights move outwardly in response to the centrifugal force caused by rotation of driven member 5 the downwardly extending tabs on each auxiliary weight engage corresponding upwardly extending tabs provided on the adjacent clutch shoe. Thus the mass of each weight is effectively added to the mass of the adjacent clutch shoe so that the clutch shoe in effect has a greater mass and the centrifugal force acting on the clutch shoes will cause them to overcome the force of springs 17 and 18 at a lower speed.

In order to control the auxiliary masses so that they selectively may be caused to contact the clutch shoes or be held out of engagement with the clutch shoes I provide a speed selection mechanism including a trigger for each auxiliary mass such as shown at 30. The triggers 30 are mounted on driven member 5 by means of pins 31, which are secured to the driven member and extend through elongated slots 32 provided in the triggers. Thus the triggers are free to move radially with respect to the driven member and are normally held in a radially inward position by means of springs 33, each of which is connected at one end to one of the triggers and at the other to a stud such as that shown at 34, provided on the under surface of member 5.

Figure 4:
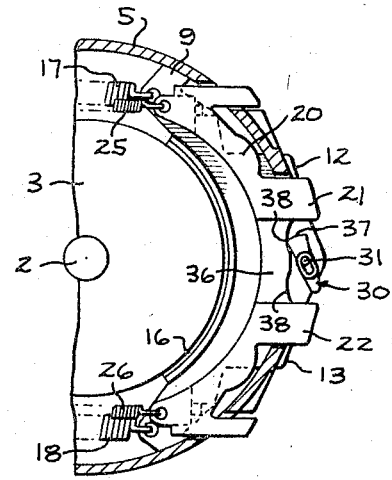
FIGURE 4 is a fragmentary plan view similar to FIGURE 3, showing a third position of the auxiliary mass and trigger.

Each of the triggers includes an inwardly extending arm 35 which is adapted to engage a double cam surface 36 provided along the outer edge of the associated auxiliary weight. The double cam surface 36 is formed as an outwardly extending protrusion 37 positioned between a pair of recesses 38. The arm 35 normally engages the outwardly extending protrusion 37 however, when the trigger is rotated about its mounting pin the inwardly extending arm will move off of the protrusion 37 into one of the recesses 38 to allow the auxiliary weight to move radially outwardly. As may best be seen in FIGURES 3 and 4, even when the triggers are in their radially outward position, they are effective to keep the auxiliary weights from engaging their associated clutch shoes, so long as the inwardly extending arm of the trigger engages the protrusion of its cooperating auxiliary weight. However, when the triggers have been rotated about their mounting pins so that the arm 35 engages one of the recesses 38 the auxiliary weight is allowed to move radially outwardly an additional distance which is sufficient for the auxiliary weight to contact its associated clutch shoe.

In order to rotate the triggers about their associated mounting pins I provide a control member such as arm 39. As seen in FIGURE 1, arm 39 forms the armature of a solenoid including a coil 40 with both the coil and the arm being mounted on a bracket 41 extending outwardly from motor 1. One end of the arm 39 is provided with a tab 42 positioned to selectively engage the triggers 30 while the other end is formed to be attracted by the armature coil 40. The arm 39 is pivotally mounted on the bracket adjacent its mid point and is biased by a spring 43 so that the tab 42 is normally held away from triggers 30. When the coil 40 is energized from a source of electrical energy (not shown) arm 39 is pivoted about its mid point against the force of spring 43 and tab 42 moves toward the clutch. Then, when the coil is de-energized spring 43 is effective to pivot arm 39 away from the clutch. The spacing between arm 39 and the clutch is such that tab 42 is out of the rotary path of the triggers at all times when coil 40 is de-energized. Additionally tab 42 is out of the path of the triggers when coil 40 is energized until the triggers have moved to their radially outward position on their mounting pins 31. At this time an outwardly extending arm 44 provided on each trigger will engage the tab 42 so that the triggers will be rotated about the mounting pins and the inwardly extending arms 35 will move off the cooperating protrusion 37 into one of the recesses 38.

In operation, if the higher speed of output member 5 is desired, coil 40 is left in its de-energized position so that tab 42 will always be out of the path of the triggers 30. As motor 40 comes up to speed the frictional force between input member 3 and clutch shoes 8 and 9 causes the clutch shoes to rotate with the input member. The clutch shoes drive the output member 5 so that the output member also rotates with the input member. At a first relatively low predetermined speed the auxiliary weights 19 and 20 overcome the force of springs 25 and 26 and move radially outwardly. The protrusions 37 on the auxiliary weights engage the inner arms of the triggers and thus the triggers are also forced radially outwardly. However, since the solenoid coil is not energized the control member will not rotate the triggers and the auxiliary weights will be held off of the clutch shoes. Then as the input member reaches a higher predetermined speed the centrifugal force acting on the clutch shoes become sufficient to overcome the force of springs 17 and 18 and the pressure between clutching surfaces 15 and 16 and input member 3 is reduced to a value sufficient to cause the clutch shoes to slip with respect to the input member. The output member then effectively maintains this speed.

When a lower operational speed is desired, solenoid coil 40 is energized, thus moving tab 42 toward the clutch mechanism. Then as the motor causes the clutch mechanism to reach the speed at which the auxiliary weights move outwardly, the triggers will move outwardly to a position where their outwardly extending arms 44 engage the tabs 42 so that the triggers are rotated off of the protrusions 37 into one of the recesses 38. This allows the auxiliary weights to move even further outwardly. This further movement allows the auxiliary weights to engage the clutch shoes and effectively add their mass to the mass of the clutch shoes. When this occurs the mass of the clutch shoes will be sufficient to overcome the effect of spring 17 and 18 at a speed which is lower than the speed at which the clutch shoes alone will overcome the effect of the springs. Thus, the output member 5 will be effectively driven at a second predetermined speed lower than the first speed.

Since the triggers are not moved outwardly to a position at which they may be engaged by the control member until the speed is reached at which the auxiliary weights move outwardly, the triggers will remain in their pivoted positions once they are pivoted by control member 39. This effectively prevents repeated engagements between the control member and the triggers and eliminates the undesirable noise associated with other clutches of this type.

While I have shown the triggers as being mounted separately it will be obvious to those skilled in the art that other mounting arrangements may be utilized to achieve this result and such mounting arrangements are included in my invention. For instance, the triggers may be mounted directly on the auxiliary weights or, they may be mounted independently and their mass matched to the force of their biasing springs so that they move outwardly independently of the auxiliary weights just before the auxiliary weights move outwardly.

While, in accordance with the patent statutes, I have described what at present is considered to be the preferred embodiment of my invention, it will be obvious to those skilled in the art that various changes and modifications may be made therein without departing from the invention and I therefore aim in the appended claims to cover all such changes and modifications as fall within the true spirit and scope of my invention.

What I claim as new and desire to secure by Letters Patent of the United States is:

1. A multiple-speed clutch comprising:
   (a) a rotary input member;
   (b) a rotary driven output member coaxial with said input member;
   (c) a clutch shoe mounted on said driven member and including a clutching surface engageable with said input member;
   (d) spring means biasing said surface against said input member;
   (e) rotation of said driven member at a predetermined speed causing a centrifugal force to be exerted on said shoe sufficient to overcome said spring and cause said shoe to slip with respect to said input member;
   (f) an auxiliary mass mounted on said driven member and responsive to centrifugal force at a speed of said driven member lower than said predetermined speed to move into engagement with said shoe so that said shoe will slip with respect to said drum at a speed less than said predetermined speed;
   (g) a trigger mounted on said driven member and biased to a radially inward position, said trigger being movable to a radially outward position in response to the rotation of said driven member at a speed at least as slow as the speed to cause movement of said auxiliary mass, said trigger normally preventing said auxiliary weight from engaging said shoe;
   (h) a control member movable between first and second positions and means for so moving said control member, said control member in its first position being moved from the rotary path of said trigger in either radial position of said trigger, said control member in its second position being in the rotary path of said trigger only when said trigger is in its radially outward position to pivot said trigger and thereby allow said auxiliary weight to engage said shoe.

2. A multiple-speed clutch comprising:
   (a) a rotary input member;
   (b) a rotary driven output member coaxial with said input member;
   (c) a clutch shoe mounted on said driven member and including a clutching surface engageable with said input member;
   (d) spring means biasing said surface against said input member;
   (e) rotation of said driven member at a predetermined speed causing a centrifugal force to be exerted on said shoe sufficient to overcome said spring and cause said shoe to slip with respect to said input member;
   (f) an auxiliary mass mounted on said driven member and responsive to centrifugal force at a speed of said driven member lower than said predetermined speed to move into engagement with said shoe so that said shoe will slip with respect to said drum at a speed less than said predetermined speed;
   (g) a trigger mounted on said driven member and biased to a radially inward position, said trigger being movable to a radially outward position by said auxiliary mass, said trigger normally preventing said auxiliary weight from engaging said shoe;
   (h) a control member movable between first and second positions and means for so moving said control member, said control member in its first position being removed from the rotary path of said trigger in either radial position of said trigger, said control member in its second position being in the rotary path of said trigger only when said trigger is in its radially outward position to pivot said trigger and thereby allow said auxiliary weight to engage said shoe.

3. A multiple-speed clutch comprising:
   (a) a rotary input member;
   (b) a rotary driven output member coaxial with said input member;
   (c) a clutch shoe mounted on said driven member and including a clutching surface engageable with said input member;
   (d) spring means biasing said surface against said input member;
   (e) rotation of said driven member at a predetermined speed causing a centrifugal force to be exerted on said shoe sufficient to overcome said spring and cause said shoe to slip with respect to said input member;
   (f) an auxiliary mass mounted on said driven member and responsive to centrifugal force at a speed of said driven member lower than said predetermined speed to move into engagement with said shoe so that said shoe will slip with respect to said drum at a speed less than said predetermined speed;
   (g) a trigger having an elongated slot therethrough, a mounting pin secured to said driven member and passing through said slot,
   (h) means biasing said trigger to a radially inward position, said trigger being movable to a radially outward position by said auxiliary mass, said trigger normally preventing said auxiliary weight from engaging said shoe,
   (i) a control member movable between first and second positions and means for so moving said control member, said control member in its first position being removed from the rotary path of said trigger in either radial position of said trigger, said control member in its second position being in the rotary path of said trigger only when said trigger is in its radially outward position to pivot said trigger and thereby allow said auxiliary weight to engage said shoe.

References Cited

UNITED STATES PATENTS

| | | | |
|---|---|---|---|
| 3,159,257 | 12/1964 | Bochan | 192—104 |
| 3,199,649 | 8/1965 | Bochan et al. | 192—114 X |
| 3,258,095 | 6/1966 | Shelton | 192—103 |

BENJAMIN W. WYCHE, III, *Primary Examiner.*